(12) United States Patent
Komori

(10) Patent No.: US 7,925,799 B2
(45) Date of Patent: Apr. 12, 2011

(54) SERIAL ATA INTERFACE CONTROL CIRCUIT AND POWER MANAGEMENT METHOD WHEREIN START AND COMPLETION OF DATA TRANSFER IS MONITORED DURING DMA OPERATIONS USING MEMORY CONTROL UNIT

(75) Inventor: Takumi Komori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 444 days.

(21) Appl. No.: 12/103,937

(22) Filed: Apr. 16, 2008

(65) Prior Publication Data

US 2008/0270642 A1   Oct. 30, 2008

(30) Foreign Application Priority Data

Apr. 27, 2007   (JP) ................................ 2007-119906
Feb. 29, 2008   (JP) ................................ 2008-050961

(51) Int. Cl.
*G06F 13/18* (2006.01)
*G06F 3/06* (2006.01)
*G06F 1/32* (2006.01)

(52) U.S. Cl. ................ 710/22; 710/15; 710/16; 710/17; 710/18; 710/19; 710/34; 710/74; 710/59; 713/320; 713/323; 711/115; 709/200; 709/234

(58) Field of Classification Search ............. 710/15–19, 710/74, 22, 59, 34; 713/320, 323; 711/115; 709/200, 234
See application file for complete search history.

(56) References Cited

U.S. PATENT DOCUMENTS

| | | | | |
|---|---|---|---|---|
| 6,965,956 | B1 * | 11/2005 | Herz et al. ...................... | 710/74 |
| 7,010,711 | B2 * | 3/2006 | Bashford et al. .............. | 713/323 |
| 7,028,199 | B2 * | 4/2006 | Ayyavu et al. ................ | 713/323 |
| 7,124,248 | B2 * | 10/2006 | Huffman et al. ............... | 711/115 |
| 7,254,732 | B2 * | 8/2007 | Bashford et al. .............. | 713/324 |
| 7,330,989 | B2 * | 2/2008 | Bashford et al. .............. | 713/323 |
| 7,631,117 | B2 * | 12/2009 | Aida et al. ...................... | 710/50 |
| 7,747,885 | B2 * | 6/2010 | Igari .............................. | 713/320 |
| 7,818,479 | B2 * | 10/2010 | Takeuchi et al. ................ | 710/59 |
| 2005/0080842 | A1 * | 4/2005 | Takeuchi et al. .............. | 709/200 |

FOREIGN PATENT DOCUMENTS

| | | |
|---|---|---|
| EP | 0458756 A1 * | 11/1991 |
| JP | 10-290270 | 10/1998 |
| JP | 2001-236182 | 8/2001 |
| JP | 2005-78514 | 3/2005 |

* cited by examiner

Primary Examiner — Tammara Peyton
(74) Attorney, Agent, or Firm — Oblon, Spivak, McClelland, Maier & Neustadt, L.L.P.

(57) ABSTRACT

A serial ATA interface interfaces an ASIC with a HDD. A transfer start monitoring unit monitors start of data transfer between the ASIC and the HDD and a transfer completion monitoring unit monitors completion of the data transfer. A power management control unit controls power consumption of the ASIC and the HDD based on monitoring results obtained from the transfer start monitoring unit and the transfer completion monitoring unit.

15 Claims, 8 Drawing Sheets

| READ | WRITE |
|---|---|
| ALTERNATE STATUS REGISTER (4012) | DEVICE CONTROL REGISTER (4011) |
| DATA REGISTER (16-BIT) (4010) ||
| ERROR REGISTER (4009) | FEATURE REGISTER (4008) |
| SECTOR COUNT REGISTER (4007) ||
| SECTOR NUMBER REGISTER (4006) ||
| CYLINDER LOW REGISTER (4005) ||
| CYLINDER HIGH REGISTER (4004) ||
| DEVICE/HEAD REGISTER (4003) ||
| STATUS REGISTER (4002) | COMMAND REGISTER (4001) |

FIG. 4

| 7 | 6 | 5 | 4 | 3 | 2 | 1 | 0 |
|---|---|---|---|---|---|---|---|
| BSY | DRDY | # | # | DRQ | OBS | OBS | ERR |
| 5001 | 5002 | 5003 || 5004 | 5005 || 5006 |

SERIAL ATA INTERFACE CONTROL CIRCUIT AND POWER MANAGEMENT METHOD WHEREIN START AND COMPLETION OF DATA TRANSFER IS MONITORED DURING DMA OPERATIONS USING MEMORY CONTROL UNIT

CROSS-REFERENCE TO RELATED APPLICATIONS

The present application claims priority to and incorporates by reference the entire contents of Japanese priority documents, 2007-119906 filed in Japan on Apr. 27, 2007 and 2008-050961 filed in Japan on Feb. 29, 2008.

BACKGROUND OF THE INVENTION

1. Field of the Invention

The present invention relates to a technology for controlling an interface between a control unit and a memory unit in an image processing apparatus.

2. Description of the Related Art

Currently, an advanced technology attachment (ATA) bus is available as an interface standard for interfacing a peripheral device, such as a hard disk drive (HDD), to a host system. Initially, data transfer through the ATA bus was performed by using a parallel data transfer method. However, the data transfer rate in a parallel ATA bus (Ultra ATA133) is 133 MB/s at a maximum and can hardly be increased further.

Meanwhile, in recent times, apart from being used in a server or a personal computer (PC), an HDD has a wide range of applications in, e.g., household appliances, mobile devices, and image processing apparatuses such as printers, copying machines, and multifunction products (MFPs). Following the increasing use of the HDD and rapid enhancement in the storage density thereof, it has become necessary to provide a compatible high-speed interface for HDDs.

To satisfy the demand for a high-speed interface, a next generation interface standard called serial ATA bus has been developed. Unlike the parallel ATA bus, data transfer through the serial ATA is performed by using a parallel data transfer method. A first generation serial ATA bus has a data transfer rate of 150 MB/s, i.e., higher than the parallel ATA bus. Moreover, the development of a future serial ATA bus having a data transfer rate of 300 MB/s or 600 MB/s is also underway.

The serial ATA bus includes four functional layers: a physical layer, a link layer, a transport layer, and an application layer. The physical layer has an ability to perform high-speed signal transmission and reception. Moreover, the physical layer interprets a received signal and transmits interpreted information to the link layer, and outputs a signal based on a request from the link layer. The link layer requests the physical layer to output a signal upon a request from the transport layer and transmits that signal to the transport layer. The transport layer converts a received signal into an ATA-compatible signal. The application layer corresponds to a user related circuit such as a direct memory access interface (DMA I/F) or a software application.

More particularly, the physical layer performs data conversion between serial data and parallel data, 8B/10B encoding, and clock data recovery (CDR). The link layer performs generation and control of a communication protocol, generation of a cyclic redundancy check (CRC), and scrambling. The transport layer performs format embedding or format decomposition of an HDD command or HDD data to obtain data in a transferable format. The application layer maintains compatibility with a conventional ATA bus and a software application thereof. Thus, a driver software application of a conventional ATA bus can be used as it is for the serial ATA bus. In that sense, the application layer is equivalent to the conventional ATA bus.

As described above, in recent times, the HDD is used in an image processing apparatus such as a printer, a copying machine, or an MFP for storing image data. Thus, the performance of the image processing apparatus largely depends on the data transfer rate with respect to the HDD. Moreover, it is also necessary for the image processing apparatus to maintain compatibility with conventional software applications. In this light, it is now a requisite to use a serial ATA bus and an HDD compatible to the serial ATA bus in image processing apparatuses.

By the way, Japanese Patent Application Laid-open No. 2005-78514 discloses a technique to reduce power consumption of an electronic device by efficiently using a power saving function of a serial ATA bus included therein. More particularly, when issuing or reception of a predetermined command is detected, the reduction in power consumption is achieved by putting the serial ATA bus in a power saving mode after execution of that command is complete.

Meanwhile, because full-duplex data transfer method is implemented in the serial ATA, the serial ATA bus constantly performs communication with a connected HDD even when no data transfer is being performed therebetween. In other words, the physical layer and the link layer in the serial ATA bus are always operating. This increases the power consumption of the HDD. Moreover, because the physical layer is made of an analog circuit, the power consumption increases further.

To solve such a problem, a power management mode, in which no communication is performed with a connected HDD except when there is a data transfer, is adopted in the serial ATA bus to reduce the power consumption of the HDD. Specifically, a serial signal line in the physical layer is neutralized. However, the serial ATA standard describes a method for controlling the power management mode (transition of a serial ATA bus between a power management mode and a normal mode) only for the physical layer, the link layer, and the transport layer. There is no description of a method for controlling the power management mode for the application layer.

SUMMARY OF THE INVENTION

It is an object of the present invention to at least partially solve the problems in the conventional technology.

According to an aspect of the present invention, there is provided an interface control circuit including a memory unit that stores therein data; a control unit that has an application function and that includes a memory control unit that controls data transfer with the memory unit; a serial ATA interface that interfaces the memory unit and the memory control unit; a transfer start monitoring unit that monitors start of data transfer between the memory unit and the memory control unit; a transfer completion monitoring unit that monitors completion of the data transfer; and a power management control unit that, based on monitoring results obtained from the transfer start monitoring unit and the transfer completion monitoring unit, controls power consumption of the memory unit and the control unit.

According to another aspect of the present invention, there is provided an image processing apparatus including an engine unit that functions as a hardware resource for image processing; a memory unit that stores therein image data; a control unit that has an application function relating to image processing and that includes a memory control unit that controls data transfer with the memory unit; a serial ATA interface that interfaces the memory unit and the memory control unit; a transfer start monitoring unit that monitors start of data transfer between the memory unit and the memory control unit; a transfer completion monitoring unit that monitors completion of the data transfer; and a power management control unit that, based on monitoring results obtained from the transfer start monitoring unit and the transfer completion monitoring unit, controls power consumption of the memory unit and the control unit.

According to still another aspect of the present invention, there is provided a method of power management implemented in an interface control circuit, the interface control circuit including a memory unit that stores therein data, a control unit that that has an application function and that includes a memory control unit that controls data transfer with the memory unit, and a serial ATA interface that interfaces the memory unit and the memory control unit. The method including first monitoring including monitoring start of data transfer between the memory unit and the memory control unit; second monitoring including monitoring completion of the data transfer; and controlling power consumption of the memory unit and the control unit based on monitoring results obtained at the first monitoring and the second monitoring.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments. Given below is the description of an image processing apparatus, a hard disk drive (HDD) controller that functions as a serial ATA HDD interface, a direct memory access (DMA) write operation of the HDD controller, and a DMA read operation of the HDD controller. A serial ATA compatible HDD is considered to be an exemplary storage medium having an in/out (I/O) interface.

Figure 1:
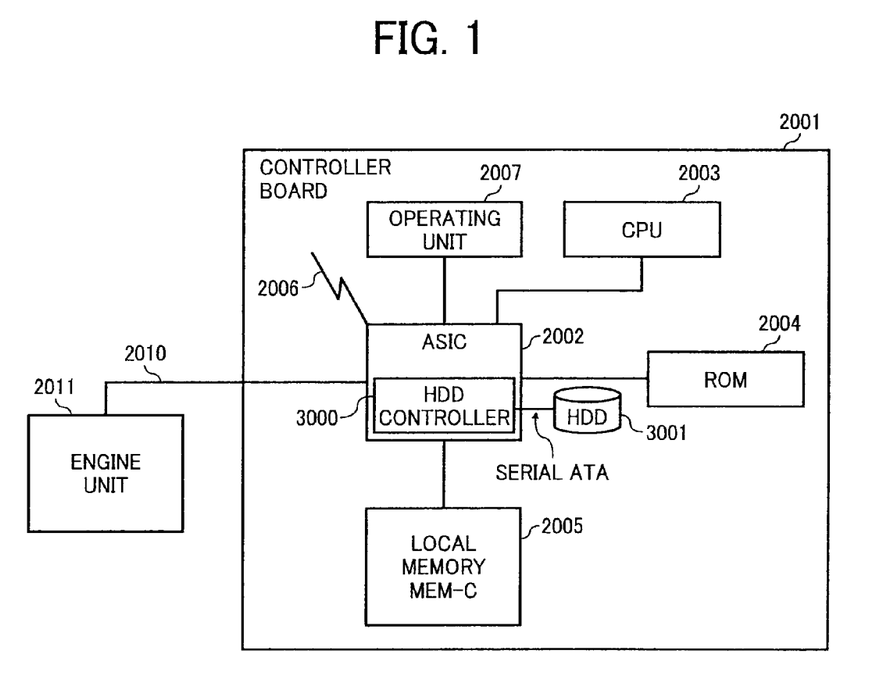
FIG. 1 is a schematic diagram of an image processing apparatus according to an embodiment of the present invention.

FIG. 1 is a schematic diagram of an image processing apparatus according to an embodiment of the present invention. The image processing apparatus includes a controller board 2001 and an engine unit 2011. A HDD controller 3000 is arranged in the controller board 2001 for controlling operations of an HDD 3001, which is a serial ATA compatible HDD.

The controller board 2001 controls the entire image processing apparatus, and includes an application specific integrated circuit (ASIC) 2002, a central processing unit (CPU) 2003, a read-only memory (ROM) 2004, a local memory MEM-C 2005, a network interface (I/F) 2006, an operating unit 2007, and the HDD 3001.

The ASIC 2002 performs various functions such as image input/output, image processing, and data communication. The ASIC 2002 also controls the operations of the ROM 2004, the operating unit 2007, the HDD 3001, and a peripheral component interconnect (PCI) bus 2010. More particularly, the ASIC 2002 includes the HDD controller 3000, which is connected to the HDD 3001 by a serial ATA bus. Thus, the HDD controller 3000 functions as a serial ATA HDD interface for controlling the operations of the HDD 3001.

The CPU 2003 controls the operations of the ASIC 2002 as well as the entire image processing apparatus. The ROM 2004 stores therein various information such as a computer program for operating the image processing apparatus, image data, and font data. The local memory MEM-C 2005 stores therein information such as an application program and image data. The network I/F 2006 interfaces the image processing apparatus to an external device via a network such as Internet for data communication. The operating unit 2007 includes a data input unit (not shown) such as an input key or a touch panel, and a display unit (not shown) such as a liquid crystal display (LCD). The HDD 3001 stores therein images and various types of data. The PCI bus 2010 connects the controller board 2001 to the engine unit 2011 such that data can be transferred therebetween. The engine unit 2011 includes a scanning unit (not shown) for scanning an image and a printing unit (not shown) for printing an image.

Figure 2:
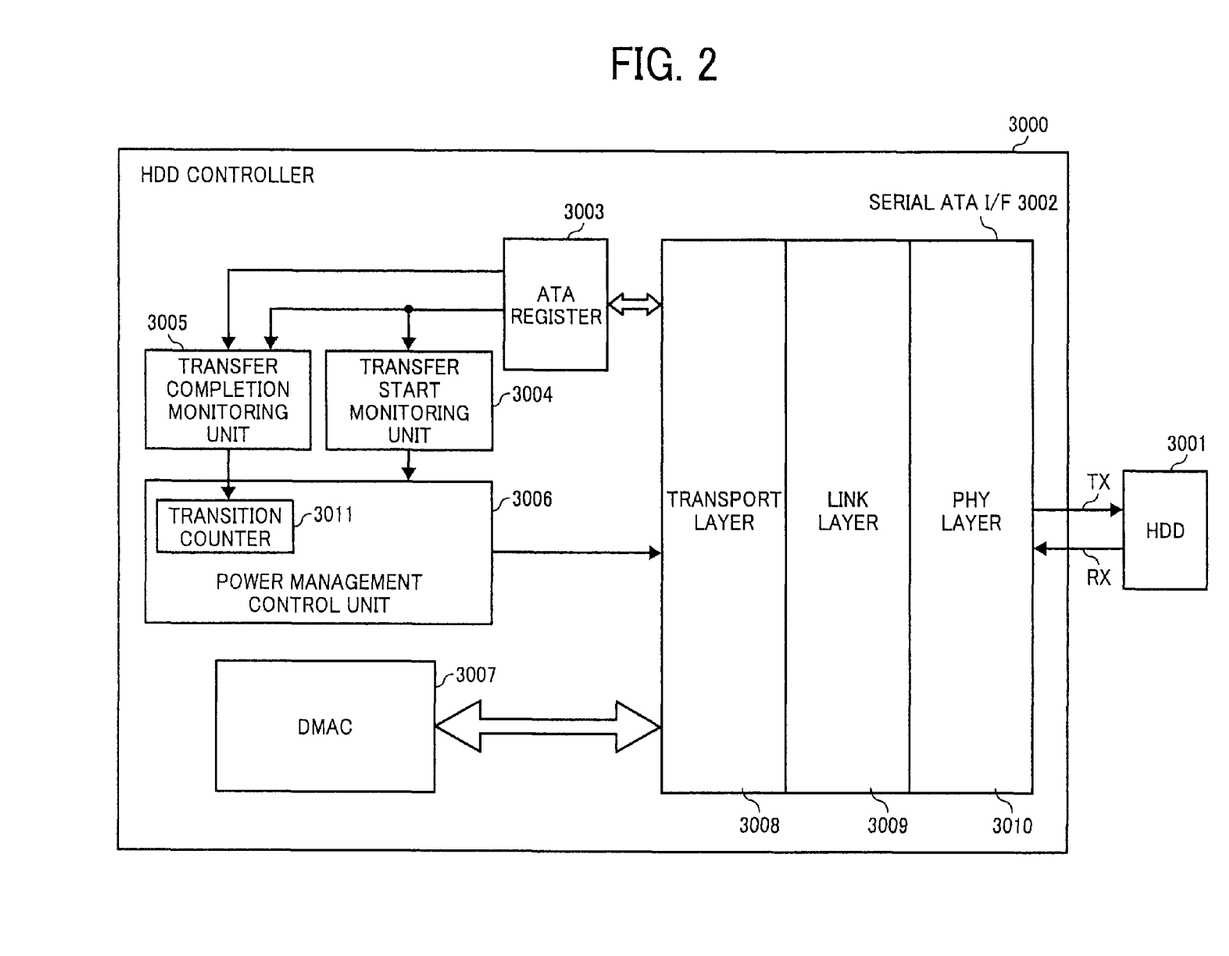
FIG. 2 is a schematic diagram of a hard disk drive (HDD) controller in the image processing apparatus.

FIG. 2 is a schematic diagram of the HDD controller 3000. The HDD controller 3000 has a control on accessing the HDD 3001, and includes a serial ATA I/F 3002, an ATA register 3003, a transfer start monitoring unit 3004, a transfer completion monitoring unit 3005, a power management control unit 3006, and a direct memory access controller (DMAC) 3007. The serial ATA HDD interface is a differential interface having a signal for transmission Tx and a signal for reception Rx. As described above, the HDD 3001 is used to store image data.

The serial ATF I/F 3002 includes a transport layer 3008, a link layer 3009, and a physical layer (PHY layer) 3010. The transport layer 3008 performs format embedding or format decomposition of a setting value of the ATA register 3003 and read/write data of the HDD 3001 with respect to a serial ATA transferable format. The link layer 3009 performs generation and control of a communication protocol, generation of a cyclic redundancy check (CRC), and scrambling. The physical layer 3010 performs data conversion between serial data and parallel data, 8B/10B encoding, and clock data recovery (CDR).

Figure 3:
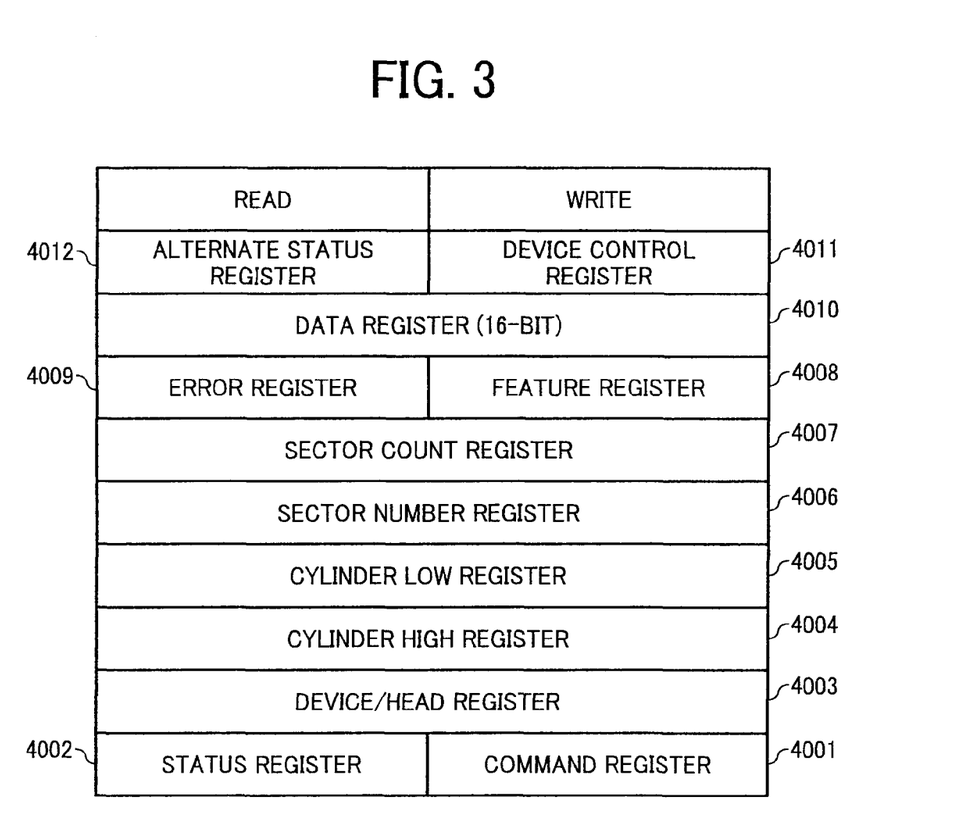
FIG. 3 is a diagram for explaining constituent registers of an ATA register in the HDD controller.

The ATA register 3003 includes a plurality of registers necessary for accessing the HDD 3001. FIG. 3 is a diagram for explaining the registers in the ATA register 3003. As shown in FIG. 3, the ATA register 3003 includes a command register 4001, a status register 4002, a device/head register 4003, a cylinder high register 4004, a cylinder low register 4005, a sector number register 4006, a sector count register 4007, a feature register 4008, an error (ERR) register 4009, a data register 4010, a device control register 4011, and an alternate status register 4012. Meanwhile, a single register can include separate registers for reading data and writing data.

Figure 4:
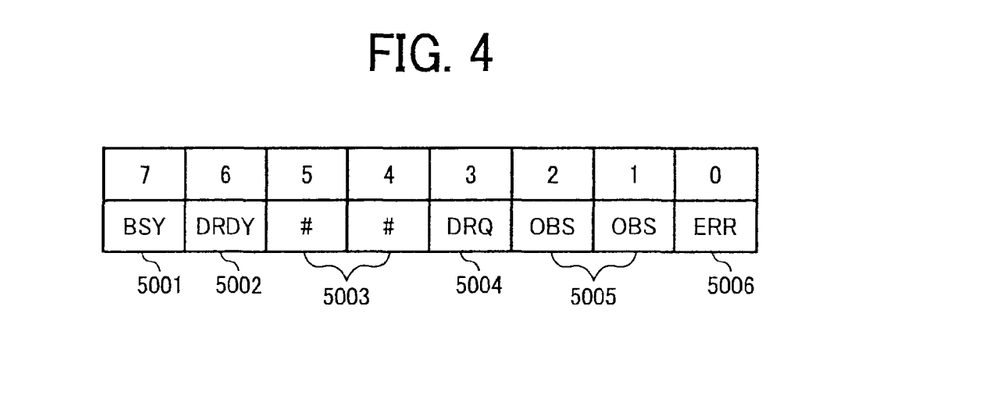
FIG. 4 is a diagram for explaining a bit configuration of a status register in the ATA register.

The command register 4001 is a write-only register for writing a read command or a write command in the HDD 3001. The status register 4002 is a read-only register in which the internal information of the HDD 3001 is reflected. FIG. 4 is a diagram for explaining a bit configuration of the status register 4002.

A BSY bit 5001 in the status register 4002 indicates whether the HDD controller 3000 is busy. The BSY bit 5001 is set to one under following conditions:

1) when a reset bit of the device control register 4011 is set to one;

2) when a command is written in the command register 4001;

3) when a DRQ bit (data request bit) 5004 in the status register 4002 is cleared to zero during a block transfer by a load command issued to the data register 4010 in a programmed input/output (PIO) transfer (data transfer performed by the CPU 2003); and 4) before clearing the DRQ bit 5004 to zero after the block transfer is complete by issuing a write command to the data register 4010 in the PIO transfer.

The BSY bit 5001 is cleared to zero under following conditions:

1) after the DRQ bit is set to one indicating that the HDD 3001 is ready for data transfer;

2) when a command is executed;

3) during a period in which the PCI bus is released by issuing an overlapped command; and 4) during the execution of either one of a power ON command, a hardware reset command, and a software reset command, and when the HDD 3001 is ready to accept a command that can be issued irrespective of the status of a DRDY bit (drive ready bit) 5002 in the status register 4002.

The DRDY bit 5002 is set to one under following conditions:

1) when all the implemented commands can be executed; and 2) when a parallel-ATA power management function for the HDD 3001 is being executed during an idle mode or a standby mode (the parallel-ATA power management function is different than a serial-ATA power management function according to the above embodiment).

The DRDY bit 5002 is cleared to zero under following condition:

1) when either one of the hardware reset command, the software reset command, and an execute device diagnostic command is executed.

The DRQ bit 5004 is set to one under following conditions:
1) when the CPU 2003 can perform the PIO transfer; and
2) when a DMA transfer is performed.

The DRQ bit 5004 is cleared to zero under following condition:

1) when the last data transfer is performed.

An ERR bit (error bit) 5006 in the status register 4002 is set to one under following condition:

1) when an error is detected after setting either one of the BSY bit 5001 and the DRQ bit 5004 to one.

The ERR bit 5006 is cleared to zero under following conditions:

1) when a new command is written in the command register 4001; and 2) when the reset bit of the device control register 4011 is set to one.

The bit definition of a # bit 5003 in the status register 4002 varies according to each command. An obs bit (obsolete bit) 5005 in the status register 4002 is a reservation bit for the ATA standard.

The device/head register 4003 is a read/write register that selects a particular HDD (e.g., HDD 3001) when a plurality of HDDs are interfaced with the HDD controller 3000. The cylinder high register 4004, the cylinder low register 4005, and the sector number register 4006 are read/write registers used to set an address for accessing the HDD 3001. The sector count register 4007 is a read/write register that determines the amount of data transfer to the HDD 3001. The feature register 4008 is a write-only register used for initializing the HDD 3001. The error register 4009 is a read-only register that provides details of an error occurred in the HDD 3001. The data register is a 16-bit read/write register used when data transfer is performed by the CPU 2003 (i.e., when the DMAC 3007 is not used). The device control register 4011 is a write-only register that functions as an interrupt enable/disable register and performs HDD reset control. The alternate status register 4012 is a substitute register for the status register 4002.

The transfer start monitoring unit 3004 monitors when the CPU 2003 accesses the command register 4001 for writing data (write access) and transmits access information to the power management control unit 3006 in the form of a command write signal.

The transfer completion monitoring unit 3005 independently monitors when the CPU 2003 accesses the BSY bit 5001, the DRDY bit 5002, the DRQ bit 5004, and the ERR bit 5006 for reading data (read access), and the command register 4001 for writing data (write access). The transfer completion monitoring unit 3005 considers a write access by the CPU 2003 to the command register 4001 as a start trigger for the monitoring operation. Consequentially, when the BSY bit 5001 is cleared to zero, the DRDY bit 5002 is set to one, and the DRQ bit 5004 is cleared to zero, the transfer completion monitoring unit 3005 transmits a signal indicating completion of data transfer to the power management control unit 3006. However, if the ERR bit 5006 is set to one (i.e., an error is detected) before satisfying the abovementioned conditions, then the signal indicating completion of data transfer is not transmitted to the power management control unit 3006.

Upon receiving the signal indicating completion of data transfer, the power management control unit 3006 obtains a threshold set in a transition counter 3011, which is arranged therein, and issues a command (power management mode command) to the serial ATA I/F 3002 such that the serial ATA I/F 3002 switches to a power management mode. Upon receiving the access information from the transfer start monitoring unit 3004, the power management control unit 3006 issues a command (return command) to the serial ATA I/F 3002 such that the serial ATA I/F 3002 returns to a normal mode from the power management mode. If the signal indicating completion of data transfer and the access information is received at the same time, the power management control unit 3006 issues the return command by priority.

The DMAC 3007 transmits the data transferred to and from the HDD 3001 to the local memory MEM-C 2005 for storage.

Figure 5:
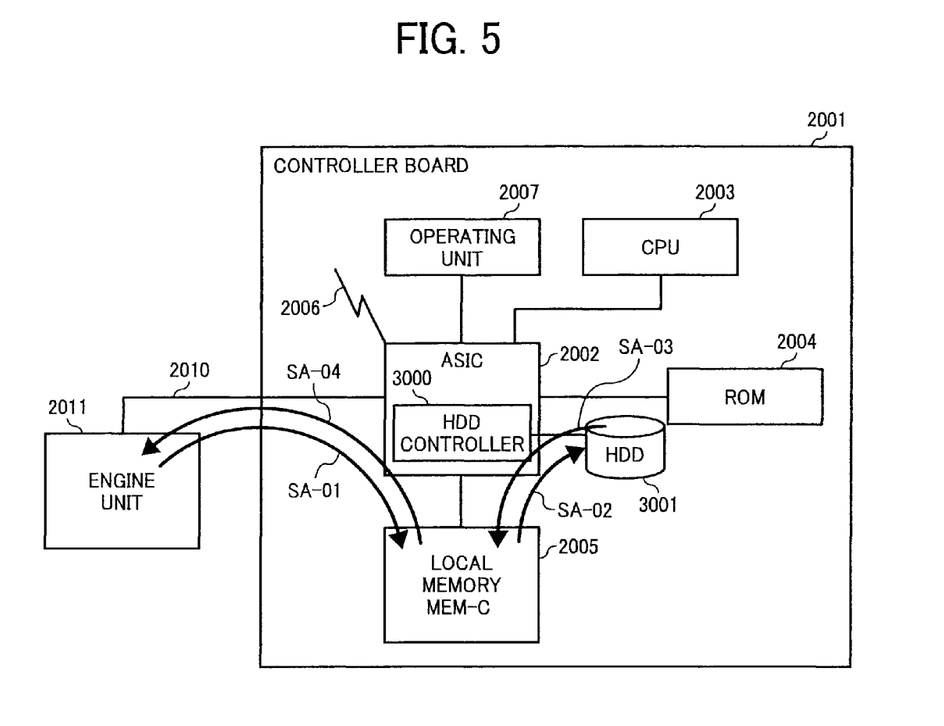
FIG. 5 is a schematic diagram of the image processing apparatus for explaining a copying process as an exemplary image forming process.

Given below is the description of a copying process as an exemplary image forming process in the image processing apparatus with reference to FIG. 5. The arrowheads in FIG. 5 indicate the flow of data.

First, when a user presses a copy button on the operating unit 2007, the scanning unit in the engine unit 2011 scans image data from an original and transfers the image data to the local memory MEM-C 2005 via the PCI bus 2010 (Step SA-01). The image data is then transferred to the HDD 3001 for storage via the HDD controller 3000 (Step SA-02).

Some of the image data in the HDD 3001 is transferred back to the local memory MEM-C 2005 via the HDD controller 3000 (Step SA-03). The image data in the local memory MEM-C 2005 is then transferred to the printing unit in the engine unit 2011 via the PCI bus 2010 such that the printer unit prints the image data on a recording medium such as a paper sheet (Step SA-04).

The transfer of image data to the HDD 3001 at Step SA-02 is performed by a DMA write operation of the HDD controller 3000. On the other hand, the transfer of image data from the HDD 3001 at Step SA-03 is performed by a DMA read operation of the HDD controller 3000. Given below is the detailed description of the DMA write operation.

Figure 6:
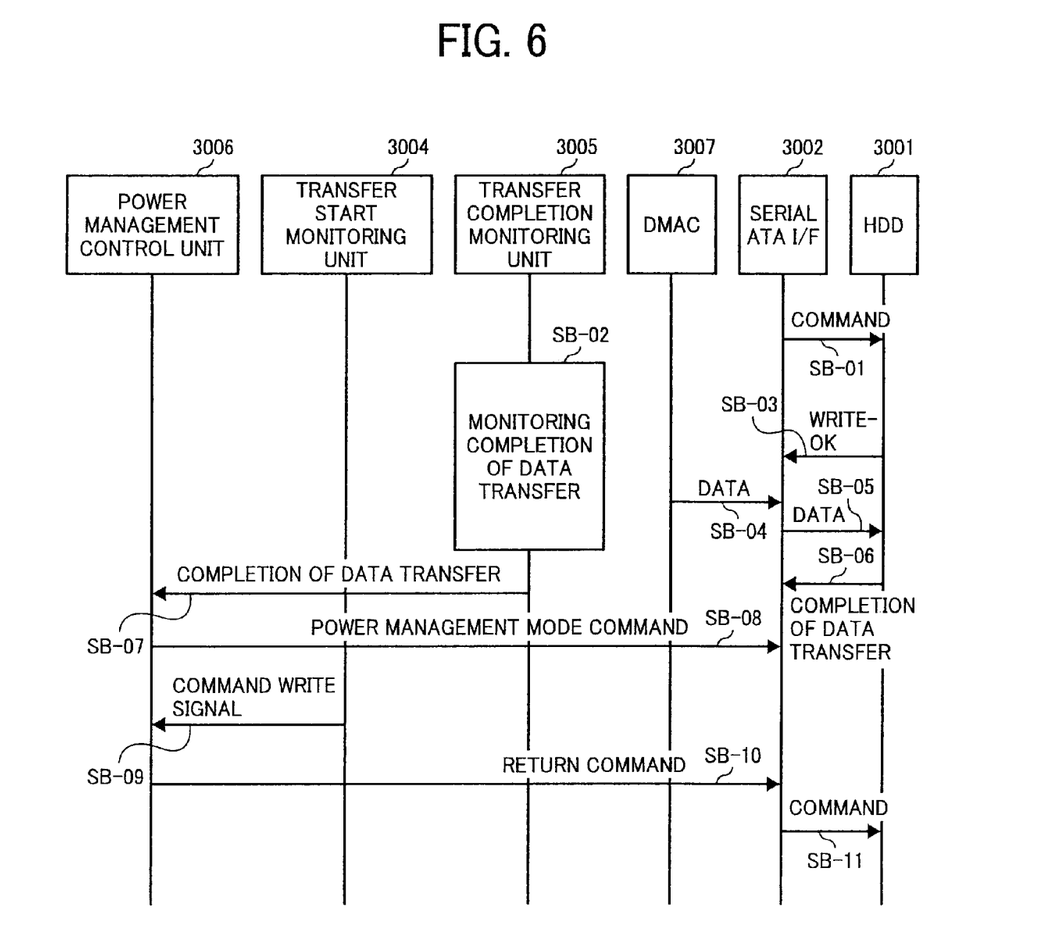
FIG. 6 is a sequence diagram for explaining communication of data and commands between constituent elements of the HDD controller, as well as between the constituent elements of the HDD controller and an HDD while performing a direct memory access (DMA) write operation.
Figure 7:
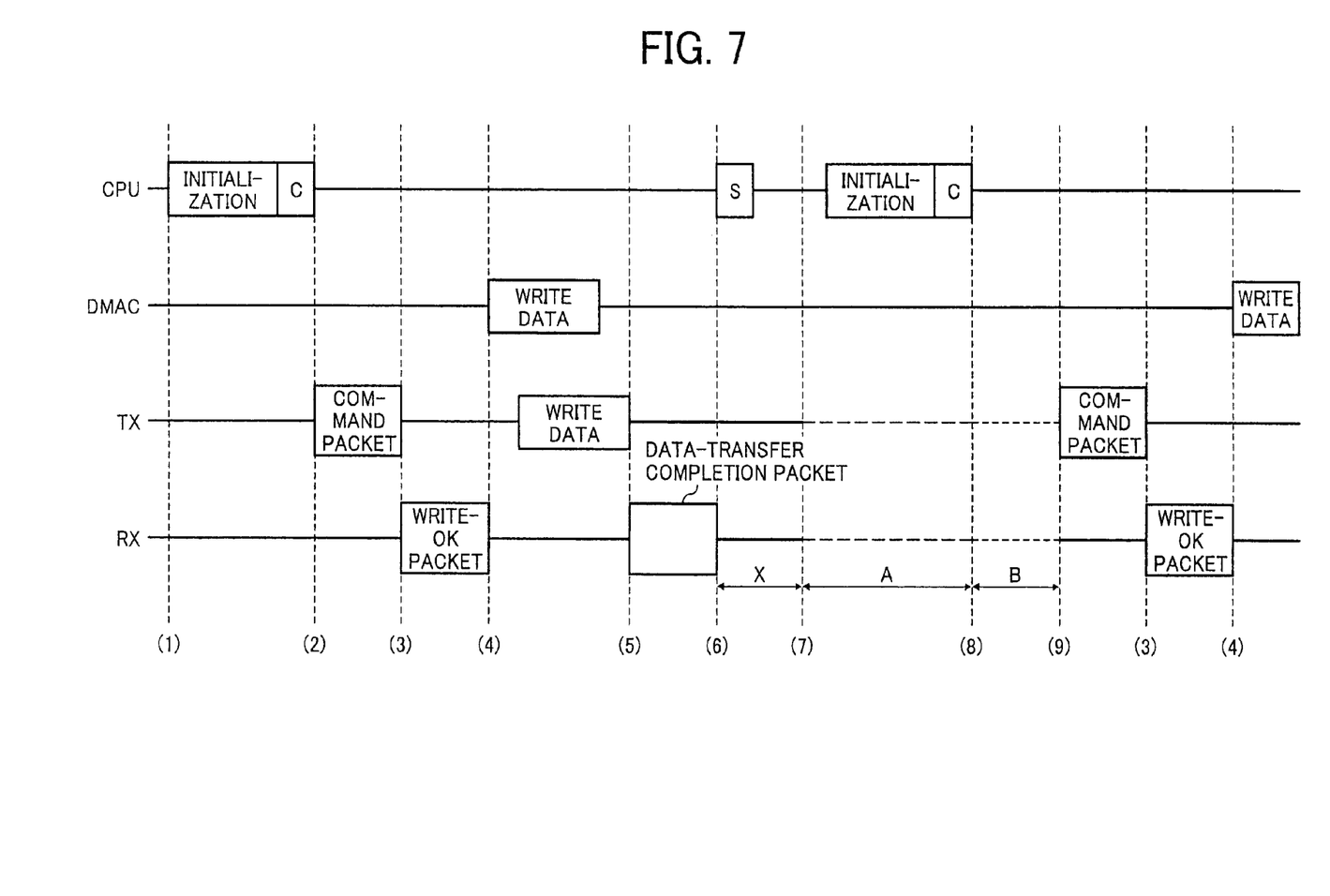
FIG. 7 is a diagram for explaining details of the DMA write operation.

FIG. 6 is a sequence diagram for explaining the communication of data and commands between the constituent elements of the HDD controller 3000, as well as between the constituent elements of the HDD controller 3000 and the HDD 3001 while performing the DMA write operation. FIG. 7 is a diagram for explaining the details of the DMA write operation.

First, the CPU 2003 initializes the ATA register 3003 and the DMAC 3007 ((1) in FIG. 7).

Then, the CPU 2003 writes a DMA write command in the command register 4001 (C in FIG. 7). At that time, the serial ATA I/F 3002 transmits ATA register information to the HDD 3001 as a command packet via the signal for transmission Tx (Step SB-01). In that case, the BSY bit 5001 is set to one, the DRDY bit 5002 is cleared to zero, and the DRQ bit 5004 is set to one ((2) in FIG. 7).

Moreover, the power management control unit 3006 receives the command write signal from the transfer start monitoring unit 3004 and issues the return command to the serial ATA I/F 3002. That process does not affect the data transfer. The transfer completion monitoring unit 3005 then receives the command write signal and starts monitoring the completion of data transfer (Step SB-02).

The serial ATA I/F 3002 then receives from the HDD 3001 a write-OK packet via the signal for reception Rx (Step SB-03). The write-OK packet is processed in the link layer 3009 ((3) in FIG. 7).

Subsequently, after getting ready for data transfer, the DMAC 3007 transmits data to the serial ATA I/F 3002 (Step SB-04). The serial ATA I/F 3002 then transfers the data to the HDD 3001 via the signal for transmission Tx ((4) in FIG. 7, Step SB-05).

When a predetermined amount of data is transferred to the HDD 3001, the HDD 3001 transmits a data-transfer completion packet to the serial ATA I/F 3002 (Step SB-06). The contents of the data-transfer completion packet are reflected in the status register 4002. When the data transfer finishes without any error, the BSY bit 5001 is cleared to zero, the DRDY bit 5002 is set to one, and the DRQ bit is cleared to zero. On the other hand, in the case of an error, the ERR bit is set to one ((5) in FIG. 7).

Upon receiving the data-transfer completion packet from the HDD 3001, the serial ATA I/F 3002 inputs a value of the data-transfer completion packet in the status register 4002. The HDD controller 3000 generates an interrupt that the CPU 2003 clears (S in FIG. 7). Meanwhile, the transfer completion monitoring unit 3005 performs monitoring independent of the CPU 2003 (Step SB-02) and, when the BSY bit 5001 is cleared to zero, the DRDY bit 5002 is set to one, and the DRQ bit 5004 is cleared to zero, transmits a signal indicating completion of data transfer to the power management control unit 3006 (Step SB-07). However, if the ERR bit 5006 is set to one, the signal indicating completion of data transfer is not transmitted to the power management control unit 3006.

Upon receiving the signal indicating completion of data transfer, the power management control unit 3006 operates the transition counter 3011 to count time after receiving that signal (counted time indicated by X in FIG. 7). If the CPU 2003 writes a command in the command register 4001 while the transition counter 3011 is counting the time, the transition counter 3011 gets reset and the power management mode command is not issued to the serial ATA I/F 3002. That is, the transition counter 3011 makes transition to a timing at (9) from a timing at (6) in FIG. 7.

When the counted time reaches a threshold set in the transition counter 3011, the power management control unit 3006 issues the power management mode command to the serial ATA I/F 3002 (Step SB-08). Consequently, the signal for transmission Tx and the signal for reception Rx switch to a neutral status indicated by 'A' at (7) in FIG. 7.

The CPU 2003 then reinitializes the ATA register 3003 and the DMAC 3007, and writes a DMA write command in the command register 4001 (C in FIG. 7). At the same time, the power management control unit 3006 receives the command write signal from the transfer start monitoring unit 3004 (Step SB-09) and issues the return command to the serial ATA I/F 3002 (Step SB-10). The time required for the serial ATA I/F 3002 to return to the normal mode from the power management mode is indicated by 'B' in FIG. 7. During that time, the serial ATA I/F 3002 cannot transmit a command packet to the HDD 3001 and the ATA register information is maintained in the transport layer 3008 ((8) in FIG. 7).

Upon returning to the normal mode, the serial ATA I/F 3002 transmits the ATA register information maintained in the transport layer 3008 to the HDD 3001 as a command packet ((9) in FIG. 7, Step SB-11). Consequently, the operations subsequent to (3) in FIG. 7 are repeated.

Figure 8:
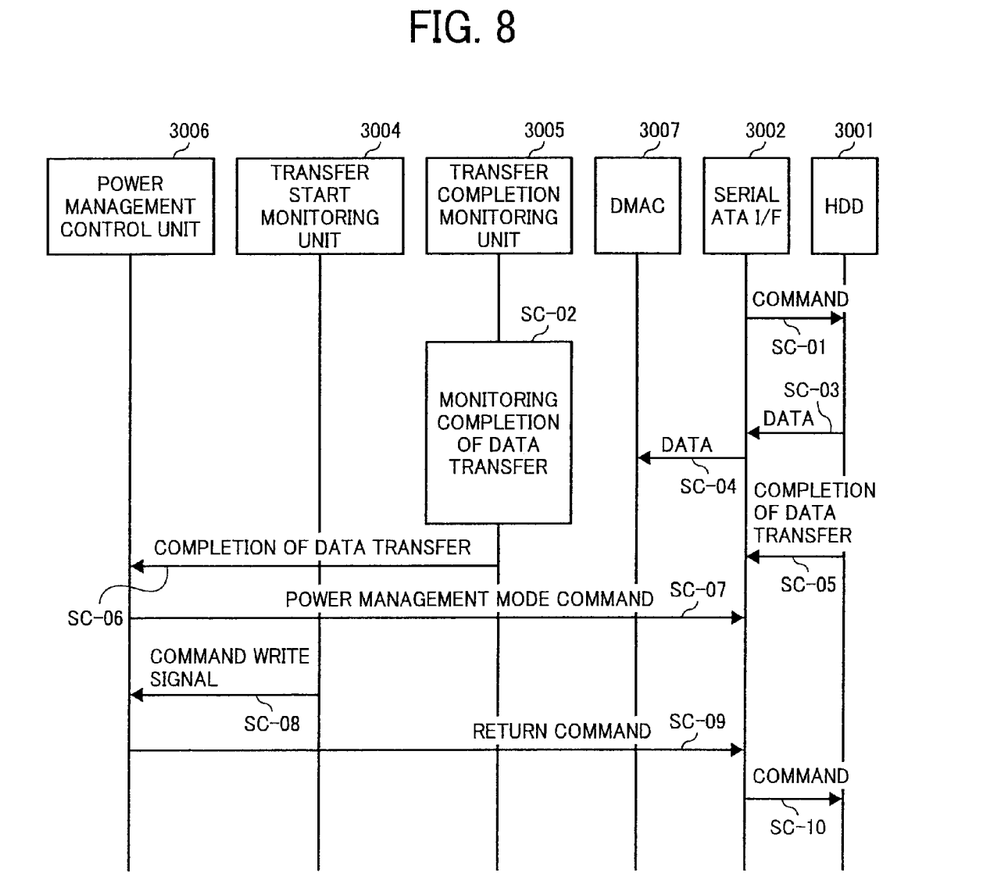
FIG. 8 is a sequence diagram for explaining communication of data and commands between constituent elements of the HDD controller, as well as between the constituent elements of the HDD controller and an HDD while performing a DMA read operation.
Figure 9:
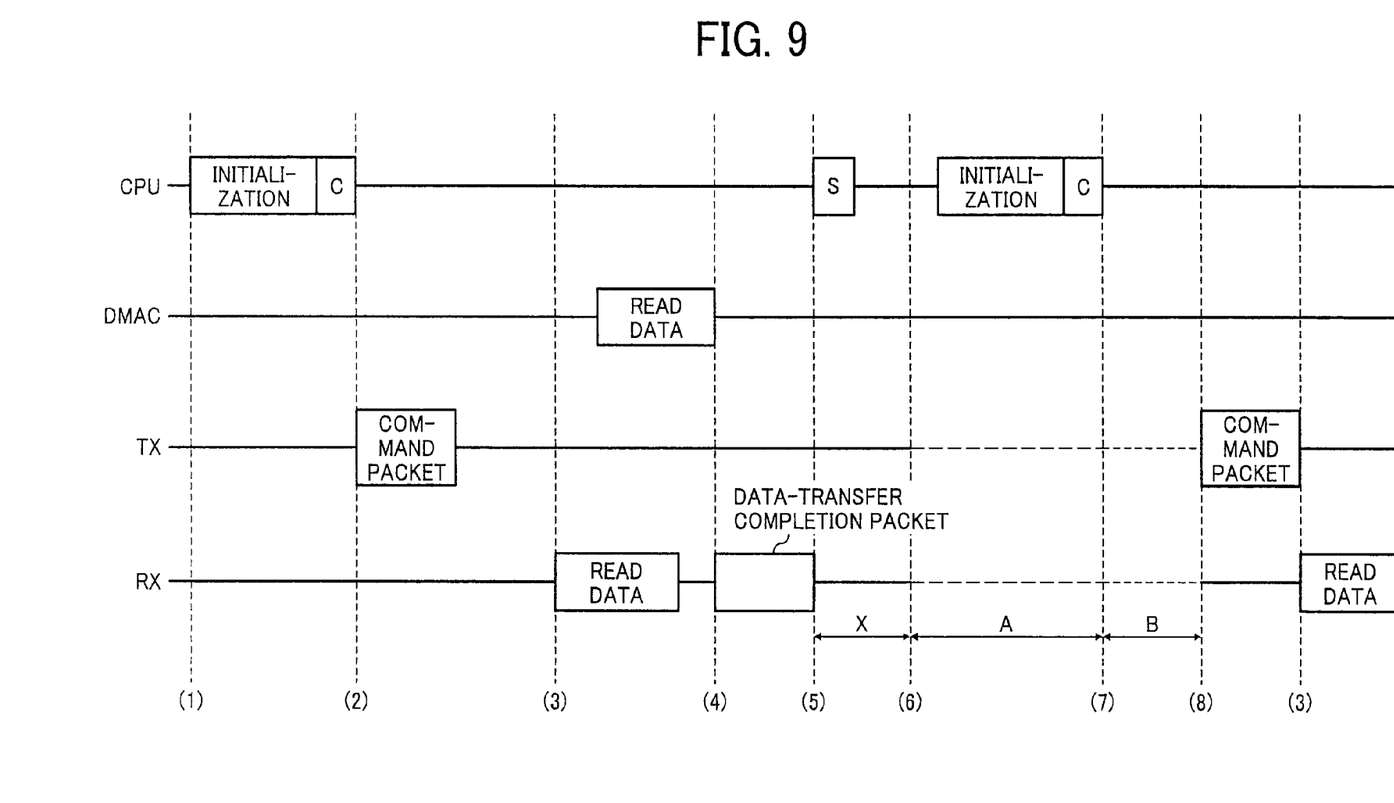
FIG. 9 is a diagram for explaining details of the DMA read operation.

Given below is the detailed description of the DMA read operation. FIG. 8 is a sequence diagram for explaining the communication of data and commands between the constituent elements of the HDD controller 3000, as well as between the constituent elements of the HDD controller 3000 and the HDD 3001 while performing the DMA read operation. FIG. 9 is a diagram for explaining the details of the DMA read operation.

First, the CPU 2003 initializes the ATA register 3003 and the DMAC 3007 ((1) in FIG. 9).

Then, the CPU 2003 writes a DMA read command in the command register 4001 (C in FIG. 9). At that time, the serial ATA I/F 3002 transmits ATA register information to the HDD 3001 as a command packet via the signal for transmission Tx (Step SC-01). In that case, the BSY bit 5001 is set to one, the DRDY bit 5002 is cleared to zero, and the DRQ bit 5004 is set to one ((2) in FIG. 9).

Moreover, the power management control unit 3006 receives the command write signal from the transfer start monitoring unit 3004 and issues the return command to the serial ATA I/F 3002. That process does not affect the data transfer. The transfer completion monitoring unit 3005 then receives the command write signal and starts monitoring the completion of data transfer (Step SC-02).

After getting ready for data transfer, the HDD 3001 transfers data to the serial ATA I/F 3002 via the signal for reception Rx (Step SC-03). Subsequently, the DMAC 3007 receives the data from the serial ATA I/F 3002 ((3) in FIG. 9, Step SC-04).

After transferring a predetermined amount of data, the HDD 3001 transmits a data-transfer completion packet to the serial ATA I/F 3002 (Step SC-05). The contents of the data-transfer completion packet are reflected in the status register 4002. When the transfer completes without any error, the BSY bit 5001 is cleared to zero, the DRDY bit 5002 is set to one, and the DRQ bit is cleared to zero. On the other hand, in the case of an error, the ERR bit is set to one ((4) in FIG. 9).

Upon receiving the data-transfer completion packet from the HDD 3001, the serial ATA I/F 3002 inputs a value of the data-transfer completion packet in the status register 4002. The HDD controller 3000 generates an interrupt that the CPU 2003 clears (S in FIG. 9). Meanwhile, the transfer completion monitoring unit 3005 performs monitoring independent of the CPU 2003 (as described at Step SC-02) and, when the BSY bit 5001 is cleared to zero, the DRDY bit 5002 is set to one, and the DRQ bit 5004 is cleared to zero, transmits a signal indicating completion of data transfer to the power management control unit 3006. However, if the ERR bit 5006 is set to one, the signal indicating completion of data transfer is not transmitted to the power management control unit 3006.

Upon receiving the signal indicating completion of data transfer, the power management control unit 3006 operates the transition counter 3011 to count time after receiving that signal (counted time indicated by X in FIG. 9). If the CPU 2003 writes a command in the command register 4001 while the transition counter 3011 is counting the time, the transition counter 3011 gets reset and the power management mode command is not issued to the serial ATA I/F 3002. That is, the transition counter 3011 makes transition to a timing at (8) from a timing at (5) in FIG. 9.

When the counted time reaches a threshold set in the transition counter 3011, the power management control unit 3006 issues the power management mode command to the serial ATA I/F 3002 (Step SC-07). Consequently, the signal for transmission Tx and the signal for reception Rx switch to a neutral status indicated by 'A' at (6) in FIG. 9.

The CPU 2003 then reinitializes the ATA register 3003 and the DMAC 3007, and writes a DMA read command in the command register 4001 (C in FIG. 9). At the same time, the power management control unit 3006 receives a command write signal from the transfer start monitoring unit 3004 (Step SC-08) and issues the return command to the serial ATA I/F 3002 (Step SC-09). The time required for the serial ATA I/F 3002 to return to the normal mode from the power management mode is indicated by 'B' in FIG. 9. During that time, the serial ATA I/F 3002 cannot transmit a command packet to the HDD 3001 and the ATA register information is maintained in the transport layer 3008 ((7) in FIG. 9).

Upon returning to the normal mode, the serial ATA I/F 3002 transmits the ATA register information maintained in the transport layer 3008 to the HDD 3001 as a command packet ((8) in FIG. 9, Step SC-10). Consequently, the operations subsequent to (3) in FIG. 9 are repeated.

Thus, because of the DMA write operation and the DMA read operation of the HDD controller 3000, the serial ATA I/F 3002 is switched to the power management mode during the period in which there is no data transfer between the HDD controller 3000 and the HDD 3001. Thus, the power consumption of the entire HDD controller 3000 can be reduced by using hardware resources and a software application. Moreover, the transition to the power management mode can be controlled without modifying a conventional software application for a parallel ATA bus.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

A software application is used to administer the abovementioned operations in the image processing apparatus. The software application instructs each constituent element of a personal computer (PC) to perform various processes and functions. For example, the software application instructs the power management control unit 3006 to issue the power management mode command to the serial ATA I/F 3002 upon receiving the signal indicating completion of data transfer such that the serial ATA I/F 3002 switches to the power management mode. Similarly, the software application instructs the power management control unit 3006 to issue the return command to the serial ATA I/F 3002 upon receiving the access information from the transfer start monitoring unit 3004 such that the serial ATA I/F 3002 returns to the normal mode from the power management mode. In this way, each operation in the image processing apparatus can be performed by running the software application on a PC.

The operations in the image processing apparatus can also be performed by loading a program code of the software application, which is stored in a computer-readable storage medium, in the CPU 2003 such that the CPU 2003 can execute the instructions given in the program code. Moreover, instead of using a storage medium, the program code can be directly loaded in the CPU 2003 via a communications line.

Thus, the program code, which is loaded from a storage medium or via a communications line, is executed to perform the operations in the image processing apparatus. The storage medium used to store the program code falls within the scope of the above embodiment.

The storage medium can be a floppy disk (registered trademark), a hard disk, an optical disk, a magnetic optical disk, a compact disk read only memory (CD-ROM), a compact disk recordable (CD-R), a nonvolatile memory card, a ROM, or a magnetic tape.

Thus, to sum up, according to an aspect of the present invention, a method of controlling a power management mode of an application layer in a serial ATA bus can be achieved by using hardware resources and a software application. Thus, it is possible to control the transition of the serial ATA bus between the power management mode and a normal mode.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An interface control circuit comprising:
a memory unit that stores therein data;

a control unit that has an application function and that includes a memory control unit that controls data transfer with the memory unit;

a serial ATA interface that interfaces the memory unit and the memory control unit;

a transfer start monitoring unit that monitors start of data transfer between the memory unit and the memory control unit;

a transfer completion monitoring unit that monitors completion of the data transfer independently from a central processing unit during a direct memory access write operation, implemented by the memory control unit, of a predetermined amount of data to the memory unit and a direct memory access read operation, implemented by the memory control unit, of a predetermined amount of data from the memory unit; and a power management control unit that, based on monitoring results obtained from the transfer start monitoring unit and the transfer completion monitoring unit, controls power consumption of the memory unit and the control unit.

2. The interface control circuit according to claim 1, wherein the transfer start monitoring unit monitors issuing of a command relating to the data transfer.

3. The interface control circuit according to claim 2, further comprising an access information storing unit that stores therein information required when accessing the memory unit, wherein
the command includes a read command and a write command with respect to the memory unit, and
when either one of the read command and the write command is written in the access information storing unit, the transfer start monitoring unit detects issuing of the command.

4. The interface control circuit according to claim 3, wherein the transfer start monitoring unit informs the power management control unit about issuing of the command as command issue information.

5. The interface control circuit according to claim 4, wherein the transfer completion monitoring unit monitors an internal state of the memory unit.

6. The interface control circuit according to claim 5, wherein the transfer completion monitoring unit starts monitoring the internal state of the memory unit when the transfer start monitoring unit detects issuing of the command.

7. The interface control circuit according to claim 6, wherein
the access information storing unit stores therein information about the internal state of the memory unit, and
when the internal state of the memory unit indicates that execution of the command and transfer of corresponding data is complete, the transfer completion monitoring unit informs the power management control unit about the internal state of the memory unit as transfer completion information.

8. The interface control circuit according to claim 7, wherein the power management control unit issues either one of a power management mode command and a return command to the serial ATA interface, the power management mode command being a command that causes an interface signal line, which connects the control unit and the memory unit, to be switched to a neutral state from a synchronized state, and the return command being a command that causes the interface signal line to return to the synchronized state from the neutral state.

9. The interface control circuit according to claim 8, wherein the power management control unit includes a counter that counts time after the power management control unit receives the transfer completion information, the power management control unit issuing the power management mode command to the serial ATA interface when counted time exceeds a predetermined threshold.

10. The interface control circuit according to claim 9, wherein the power management control unit issues the return command to the serial ATA interface upon receiving the command issue information after the interface signal line is switched to the neutral state by the power management mode command.

11. The interface control circuit according to claim 10, wherein the power management control unit resets the counter without issuing the power management mode command to the serial ATA interface upon receiving the command issue information before the counted time exceeds the predetermined threshold.

12. An image processing apparatus comprising:
an engine unit that functions as a hardware resource for image processing;
a memory unit that stores therein image data;
a control unit that has an application function relating to image processing and that includes a memory control unit that controls data transfer with the memory unit;
a serial ATA interface that interfaces the memory unit and the memory control unit;
a transfer start monitoring unit that monitors start of data transfer between the memory unit and the memory control unit;
a transfer completion monitoring unit that monitors completion of the data transfer independently from a central processing unit during a direct memory access write operation, implemented by the memory control unit, of a predetermined amount of data to the memory unit and a direct memory access read operation, implemented by the memory control unit, of a predetermined amount of data from the memory unit; and
a power management control unit that, based on monitoring results obtained from the transfer start monitoring unit and the transfer completion monitoring unit, controls power consumption of the memory unit and the control unit.

13. The image processing apparatus according to claim 12, wherein
the engine unit includes a scanning unit that scans an original to obtain image data, and
the memory control unit stores the image data in the memory unit.

14. The image processing apparatus according to claim 12, wherein
the engine unit includes a printing unit that prints image data on a recording medium, and
the memory control unit reads image data from the memory unit and transfers the image data to the printing unit.

15. A method of power management implemented in an interface control circuit, the interface control circuit including a memory unit that stores therein data, a control unit that that has an application function and that includes a memory control unit that controls data transfer with the memory unit, and a serial ATA interface that interfaces the memory unit and the memory control unit, the method comprising:
first monitoring including monitoring start of data transfer between the memory unit and the memory control unit;
second monitoring including monitoring completion of the data transfer independently from a central processing unit during a direct memory access write operation, implemented by the memory control unit, of a predetermined amount of data to the memory unit and a direct memory access read operation, implemented by the memory control unit, of a predetermined amount of data from the memory unit; and controlling power consumption of the memory unit and the control unit based on monitoring results obtained at the first monitoring and the second monitoring.

* * * * *